(12) United States Patent
Okabe et al.

(10) Patent No.: US 12,428,819 B2
(45) Date of Patent: Sep. 30, 2025

(54) WORK MACHINE AND METHOD FOR CONTROLLING WORK MACHINE

(71) Applicant: KOMATSU LTD., Tokyo (JP)

(72) Inventors: Kazuyoshi Okabe, Tokyo (JP); Shinichi Kitao, Tokyo (JP); Akira Takeno, Tokyo (JP)

(73) Assignee: KOMATSU LTD., Tokyo (JP)

( * ) Notice: Subject to any disclaimer, the term of this patent is extended or adjusted under 35 U.S.C. 154(b) by 398 days.

(21) Appl. No.: 18/004,352

(22) PCT Filed: Jul. 19, 2021

(86) PCT No.: PCT/JP2021/027009
§ 371 (c)(1),
(2) Date: Jan. 5, 2023

(87) PCT Pub. No.: WO2022/070561
PCT Pub. Date: Apr. 7, 2022

(65) Prior Publication Data
US 2023/0287657 A1    Sep. 14, 2023

(30) Foreign Application Priority Data

Sep. 30, 2020    (JP) .................................. 2020-165072

(51) Int. Cl.
*E02F 9/24*    (2006.01)
*E02F 3/28*    (2006.01)
(Continued)

(52) U.S. Cl.
CPC ................ *E02F 9/24* (2013.01); *E02F 3/283* (2013.01); *E02F 9/2033* (2013.01); *E02F 9/26* (2013.01)

(58) Field of Classification Search
CPC ....... E02F 3/283; E02F 9/0841; E02F 9/2033; E02F 9/2083; E02F 9/2253; E02F 9/24; E02F 9/26; E02F 9/262; B60T 7/22
See application file for complete search history.

(56) References Cited

U.S. PATENT DOCUMENTS

| 2006/0276948 | A1* | 12/2006 | Toda ..................... E02F 9/2246 |
| | | | 701/50 |
| 2014/0025267 | A1 | 1/2014 | Tezuka et al. |

(Continued)

FOREIGN PATENT DOCUMENTS

| CN | 103569114 A | 2/2014 |
| CN | 104334809 A | 2/2015 |

(Continued)

OTHER PUBLICATIONS

The extended European search report for the corresponding European application No. 21874865.5 issued on Jul. 2, 2024.

(Continued)

*Primary Examiner* — Tyler J Lee
(74) *Attorney, Agent, or Firm* — GLOBAL IP COUNSELORS, LLP

(57) ABSTRACT

A work machine includes a vehicle body, a rearward detecting section, and a control section. The vehicle body includes a traveling unit and a work implement disposed in front of the traveling unit. The rearward detecting section is configured to detect an object when traveling in reverse due to driving of the traveling unit. The control section is configured to decide to validate or invalidate a first control according to a detection of the object, a state of traveling in reverse, and a scooping work state by the work implement. The control section is configured to decide to validate the first control based on the scooping work state when the first control is invalidated.

15 Claims, 11 Drawing Sheets

(51) Int. Cl.
*E02F 9/20* (2006.01)
*E02F 9/26* (2006.01)

(56) References Cited

U.S. PATENT DOCUMENTS

| | | |
|---|---|---|
| 2015/0138356 A1 | 5/2015 | Kowatari et al. |
| 2016/0340867 A1 | 11/2016 | Matsuzaki |
| 2017/0121929 A1 | 5/2017 | Martinez |
| 2019/0219681 A1 | 7/2019 | Atsushi et al. |
| 2020/0173144 A1 | 6/2020 | Ito et al. |
| 2020/0232190 A1 | 7/2020 | Daimon |
| 2021/0079626 A1 | 3/2021 | Daimon |
| 2021/0350681 A1 | 11/2021 | Imaizumi et al. |

FOREIGN PATENT DOCUMENTS

| | | |
|---|---|---|
| CN | 106462165 A | 2/2017 |
| CN | 108589819 A | 9/2018 |
| CN | 109074744 A | 12/2018 |
| CN | 111051617 A | 4/2020 |
| EP | 2 100 774 A1 | 9/2009 |
| EP | 3 677 882 A1 | 8/2020 |
| JP | 6-193098 A | 7/1994 |
| JP | 9-203089 A | 8/1997 |
| JP | 2003-34232 A | 2/2003 |
| JP | 2009-57978 A | 3/2009 |
| JP | 2018-44381 A | 3/2018 |
| JP | 3219005 U | 10/2018 |
| JP | 2019-86402 A | 6/2019 |
| JP | 2019-163669 A | 9/2019 |
| JP | 2020-2698 A | 1/2020 |
| WO | 2019/171885 A1 | 9/2019 |
| WO | 2019/210931 A1 | 11/2019 |
| WO | 2020/066228 A1 | 4/2020 |

OTHER PUBLICATIONS

The International Search Report for the corresponding international application No. PCT/JP2021/027009, issued on Oct. 12, 2021.

The Office Action for the corresponding Japanese application No. 2020-165072, issued on Jan. 9, 2024.

The Office Action for the corresponding Chinese application No. 202180043275.1 issued on Apr. 30, 2024.

\* cited by examiner

WORK MACHINE AND METHOD FOR CONTROLLING WORK MACHINE

CROSS-REFERENCE TO RELATED APPLICATIONS

This application is a U.S. National stage application of International Application No. PCT/JP2021/021842, filed on Jun. 9, 2021. This U.S. National stage application claims priority under 35 U.S.C. § 119(a) to Japanese Patent Application No. 2020-123915, filed in Japan on Jul. 20, 2020, the entire contents of which are hereby incorporated herein by reference.

BACKGROUND

Technical Field

The present invention relates to a work machine and a method for controlling the work machine.

Background Information

A collision suppression system has been proposed for detecting an obstacle to the rear during reverse travel and suppressing a collision in a wheel loader that is an example of a work machine (for example, see Registration of Utility Model No. 3219005).

For example, in Registration of Utility Model No. 3219005, the speed of the vehicle body is reduced on the basis of the distance to the obstacle and a warning is issued.

SUMMARY

Scooping work for pushing earth and sand upward on sloped terrain is performed with a wheel loader. This situation is troublesome for an operator because the ground surface is detected during reverse travel as an obstacle and an obstacle warning is output in a conventional collision suppression system.

In order to avoid such a situation, the action of making a setting so that scooping work is determined and the output of the obstacle warning is stopped during the scooping work could be considered.

However, there may be a situation in which the ground surface is mistakenly detected as an obstacle when descending from a pile of earth and sand after the scooping work and an obstacle warning is outputted because the withdrawal from the scooping work is not considered.

An object of the present disclosure is to provide a work machine and a method for controlling the work machine with which it is possible to issue a warning while considering withdrawal from scooping work.

A work machine according to a present aspect comprises a vehicle body, a rearward detecting section, and a control section. The vehicle body includes a traveling unit and a work implement disposed in front of the traveling unit. The rearward detecting section detects an object when traveling in reverse due to the driving of the traveling unit. The controller decides to validate or invalidate a first control according to the detection of an object, the state of traveling in reverse, and a scooping work state of the work implement, and validates the first control on the basis of the scooping work state when the first control is invalidated.

A method for controlling the work machine of a present aspect comprises a control decision step and a control validating step. The control decision step involves deciding to validate or invalidate a first control according to the detection of an object when traveling in reverse due to the driving of a traveling unit of a vehicle body having the traveling unit and a work implement, the state of traveling in reverse, and a scooping work state of the work implement. The control validating step involves validating the first control on the basis of the scooping work state when the first control is invalidated.

According to the present disclosure, there can be provided a work machine and a method for controlling the work machine with which it is possible to issue a warning while considering withdrawal from scooping work.

DETAILED DESCRIPTION OF EMBODIMENT(S)

The following is an explanation of a wheel loader as an example of a work machine according to the present disclosure with reference to the drawings.

(Configuration)
(Outline of Wheel Loader)

Figure 1:
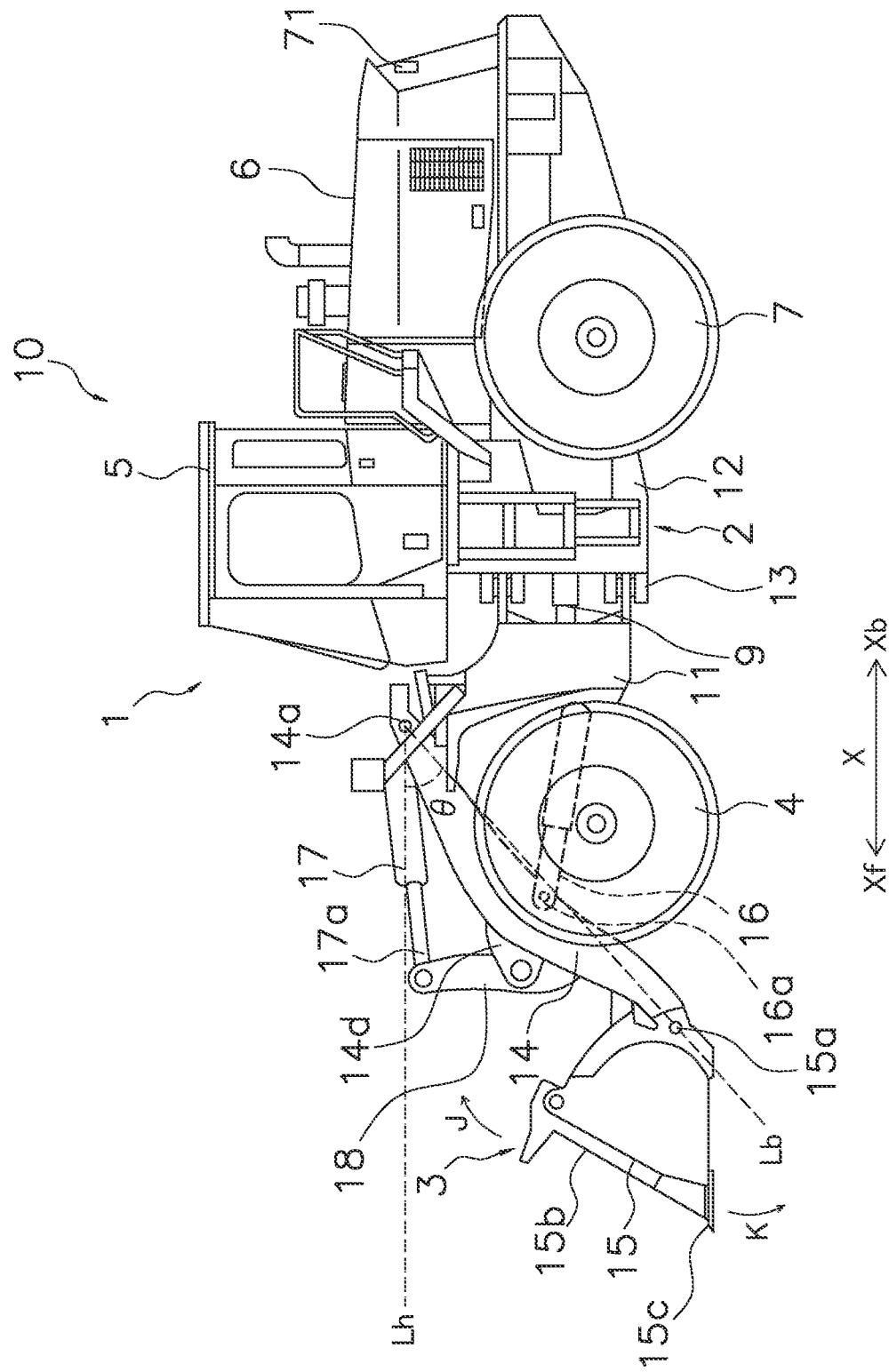
FIG. 1 is side view illustrating a wheel loader of a first embodiment according to the present disclosure.

FIG. 1 is a schematic view of a configuration of the wheel loader 10 (example of a work machine) of the present embodiment. The wheel loader 10 of the present embodiment comprises, in a vehicle body 1, a vehicle body frame 2, a work implement 3, a pair of front tires 4 (example of wheels), a cab 5, an engine room 6, a pair of rear tires 7 (example of wheels), and a steering cylinder 9. In the following explanations, "front," "rear," "right," "left," "up," and "down" indicate directions relative to a state of looking forward from the driver's seat "Vehicle width direction" and "left-right direction" have the same meaning. In FIG. 1, "X"

indicates the front-back direction, "Xf" indicates the forward direction, and "Xb" indicates the rearward direction. In addition, the vehicle body frame 2, the front tires 4, and the rear tires 7 correspond to an example of a traveling unit.

The wheel loader 10 performs work such as earth and sand loading by using the work implement 3.

The vehicle body frame 2 is a so-called articulated construction and includes a front frame 11, a rear frame 12, and a coupling shaft part 13. The front frame 11 is disposed in front of the rear frame 12. The coupling shaft part 13 is provided in the center in the vehicle width direction and couples the front frame 11 and the rear frame 12 to each other in a manner that allows swinging. The pair of front tires 4 are attached on the left and right of the front frame 11. The pair of rear tires 7 are attached to the left and right of the rear frame 12.

Figure 2:
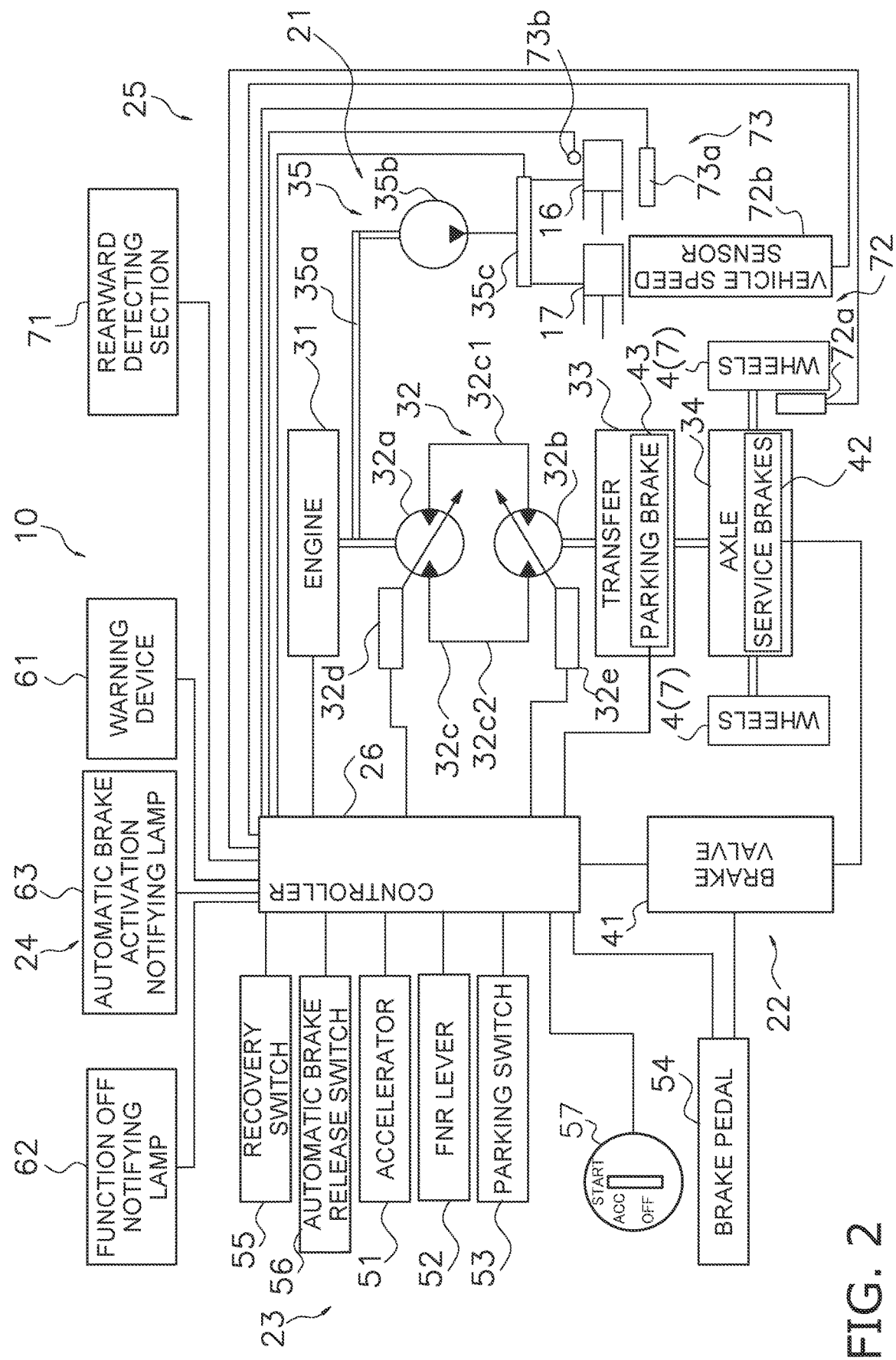
FIG. 2 is a block diagram illustrating configurations of a driving system, a braking system, an operating system, a reporting system, and a detecting system of the wheel loader in FIG. 1.

The work implement 3 is driven by hydraulic fluid from a belowmentioned hydraulic pump 35b (see FIG. 2). The work implement 3 is attached to the front part of the front frame 11 in a manner that allows swinging. The work implement 3 includes a boom 14, a bucket 15, a lift cylinder 16 (example of a boom cylinder), a bucket cylinder 17 (example of an actuator), and a bell crank 18 (example of a sub link).

The base end of the boom 14 is rotatably attached to a front part of the front frame 11 by means of a boom pin 14a. The tip end of the boom 14 is rotatably attached to a rear part of the bucket 15. The rear part of the bucket 15 is on the opposite side from an opening 15b. The tip end of a cylinder rod 16a of the lift cylinder 16 is rotatably attached between the base end and the tip end of the boom 14. The cylinder body of the lift cylinder 16 is rotatably attached to the front frame 11.

One end of the bell crank 18 is rotatably attached to the tip end of a cylinder rod 17a of the bucket cylinder 17. The other end of the bell crank 18 is rotatably attached to a rear part of the bucket 15. The bell crank 18 is rotatably supported by a bell crank support 14d near the middle of the boom 14 between either end. The cylinder body of the bucket cylinder 17 is rotatably attached to the front frame 11. The extension/contraction force of the bucket cylinder 17 is converted to rotational movement by the bell crank 18 and is transmitted to the bucket 15.

The bucket 15 is rotatably attached to a bucket pin 15a at the tip end of the boom 14 so as to open toward the front. By extending and contracting the bucket cylinder 17, the bucket 15 rotates with respect to the boom 14 and a tilting motion (see arrow J) and a dumping motion (see arrow K) are performed. The tilting motion of the bucket 15 is a tilting motion produced by the opening 15b and a claw 15c of the bucket 15 rotating toward the cab 5. The dumping motion of the bucket 15 is a motion in the opposite direction from the tilting motion and is produced by the opening 15b and the claw 15c of the bucket 15 rotating away from the cab 5.

The cab 5 is disposed on the rear frame 12. A steering handle for performing steering operations, a lever for operating the work implement 3, and various display devices are arranged inside the cab 5. The engine room 6 is disposed to the rear of the cab 5 and on the rear frame 12 and accommodates an engine 31 (see FIG. 2).

(Configuration Pertaining to Control of Wheel Loader)

FIG. 2 is a block diagram showing configurations pertaining to the control of the wheel loader 10.

The wheel loader 10 includes a driving system 21, a braking system 22, an operating system 23, a reporting system 24, a detecting system 25, and a controller 26 (example of a control section).

The driving system 21 drives the wheel loader 10. The braking system 22 performs braking while the wheel loader 10 is traveling. The operating system 23 is operated by an operator. The driving system 21 and the braking system 22 are activated on the basis of operations of the operating system 23 by the operator. The reporting system 24 issues a report to the operator on the basis of an operation of the operating system 23 or a detection result by the detecting system 25. The detecting system 25 detects the traveling state, detects the state of the work implement 3, and detects an obstacle (example of an object) to the rear of the vehicle body 1. The controller 26 (example of the control section) operates the driving system 21, the braking system 22, and the reporting system 24 on the basis of an operation by the operator on the operating system 23 and a detection by the detecting system 25.

(Driving System 21)

The driving system 21 includes the engine 31, an HST 32, a transfer 33, axles 34, the front tires 4 and the rear tires 7, and a cylinder driving section 35.

The engine 31 is, for example, a diesel engine and driving power generated by the engine 31 drives a pump 32a of the hydro static transmission (HST) 32.

The HST 32 includes the pump 32a, a motor 32b, and a hydraulic circuit 32c that connects the pump 32a and the motor 32b. The pump 32a is a skew plate-type variable capacity pump and the angle of the skew plate can be changed with a solenoid 32d. The pump 32a is driven by the engine 31 to discharge hydraulic fluid. The discharged hydraulic fluid is fed to the motor 32b through the hydraulic circuit 32c. The motor 32b is a skew plate-type and the angle of the skew plate can be changed with a solenoid 32e. The hydraulic circuit 32c includes a first drive circuit 32c1 and a second drive circuit 32c2. The hydraulic fluid is supplied to the motor 32b from the pump 32a through the first drive circuit 32c1 whereby the motor 32b is driven in one direction (for example, the forward travel direction). The hydraulic fluid is supplied to the motor 32b from the pump 32a through the second drive circuit 32c2 whereby the motor 32b is driven in another direction (for example, the reverse travel direction). The discharge direction of the hydraulic fluid to the first drive circuit 32c1 or to the second drive circuit 32c2 can be changed by means of the solenoid 32d.

The transfer 33 distributes the output of the engine 31 to the front and rear axles 34.

The pair of front tires 4 are connected to the front side axle 34 and rotate with the distributed output from the engine 31. The pair of rear tires 7 are connected to the rear side axle 34 and rotate with the distributed output from the engine 31.

The cylinder driving section 35 includes a power take-off section 35a, a work implement pump 35b, and a control valve 35c. The power take-off section 35a is a power take-off (PTO) and extracts the output from the engine 31 and transmits the power to the work implement pump 35b while, for example, the vehicle body 1 is stopped. The work implement pump 35b is driven by power from the engine 31 and discharges hydraulic fluid to the control valve 35c. The control valve 35c supplies the hydraulic fluid supplied from the work implement pump 35b to the lift cylinder 16 (example of the boom cylinder) and the bucket cylinder 17 on the basis of a command from the controller 26.

(Braking System 22)

The braking system 22 includes a brake valve 41, service brakes 42, and a parking brake 43.

The brake valve 41 is, for example, an electric proportional valve (EPC) and is able to adjust the amount of hydraulic fluid fed to the service brakes 42 by adjusting the opening degree.

The service brakes 42 are provided to the axles 34. The service brakes 42 are hydraulic brakes and, for example, the braking force becomes stronger when the opening degree of the brake valve 41 is larger and the braking force becomes weaker when the opening degree of the brake valve 41 is smaller.

As a function of an automatic brake, the brake valve 41 is driven by an instruction from the controller 26 even when a belowmentioned brake pedal 54 is not operated, and the service brakes 42 are activated.

The parking brake 43 is provided to the transfer 33. For example, a multistage wet brake or a disc brake or the like that can be switched between a braking state and a non-braking state may be used as the parking brake 43.

(Operating System 23)

The operating system 23 includes an accelerator 51, an FNR lever 52 (example of an operating member), a parking switch 53, the brake pedal 54, a recovery switch 55, an automatic brake release switch 56, and an engine key section 57.

The accelerator 51 is provided inside the cab 5. The operator operates the accelerator 51 to set a throttle opening degree. The accelerator 51 generates an opening degree signal indicating the accelerator operating amount and transmits the opening degree signal to the controller 27. The controller 26 controls the rotation speed of the engine 31 on the basis of the transmitted signal.

When the accelerator 51 is in an OFF state, the fuel supply to the engine 31 is stopped, the skew plates of the pump 32a and the motor 32b are controlled so as to provide resistance to traveling, and a braking force (referred to below as a weak brake force) is generated due to the working of internal inertia.

The FNR lever 52 is provided inside the cab 5. The FNR lever 52 can be set to the positions of forward travel, neutral, and reverse travel. An operation signal indicating the position of the FNR lever 52 is transmitted to the controller 26, and the controller 26 controls the solenoid 32d to switch the forward travel or the reverse travel.

The parking switch 53 is provided inside the cab 5, is a switch that can be switched to an ON or an OFF state, and transmits a signal indicating the state to the controller 26. The controller 26 sets the parking brake 43 in a braking state or a non-braking state on the basis of the received signal.

The brake pedal 54 is provided inside the cab 5. The brake pedal 54 adjusts the opening degree of the brake valve 41. The brake pedal 54 also transmits the operating amount to the controller 26.

The recovery switch 55 is operated by the operator for recovering from a stopped state after the vehicle body 1 has stopped due to the belowmentioned automatic brake.

The automatic brake release switch 56 releases the function of the automatic brake and is set so that the function of the automatic brake does not work.

The engine key section 57 has three positions including an engine start position, an ACC power ON position, and an engine OFF position due to the rotation of a key. The position information of the engine key section 57 is transmitted to the controller 26.

(Reporting System 24)

The reporting system 24 includes a warning device 61 (example of a first reporting section), a function OFF notifying lamp 62 (example of a second reporting section), and an automatic brake activation notifying lamp 63.

The warning device 61 issues a warning to the operator when an obstacle has been detected to the rear of the vehicle body 1 on the basis of a detection by a rearward detecting section 71 of the belowmentioned detecting system 25. The warning device 61 may, for example, have a lamp and may cause the lamp to be lit. Moreover, the warning device 61 is not limited to a lamp and may have a speaker and may emit a sound. Moreover, the warning may be displayed on a display panel such as a monitor.

The function OFF notifying lamp 62 is, for example, lit to report to the operator when the automatic brake function is suppressed or stopped according to a judgment by the controller 26. Moreover, the function OFF notifying lamp 62 is, for example, lit to report to the operator when the automatic brake release switch 56 is operated according to a judgment by the operator and the automatic brake function is switched to the OFF state. Moreover, the function OFF notifying lamp 62 being turned off indicates that the automatic brake function is in a state of being operable. The function OFF notifying lamp 62 is not limited to a lamp and may also emit a sound. Moreover, the function OFF notifying lamp 62 may be displayed on a display panel such as a monitor.

The automatic brake activation notifying lamp 63 notifies the operator that the automatic brake is operating and notifies the operator that there is a need to perform a recovery action by means of the recovery switch 55. The automatic brake activation notifying lamp 63 turns off when the recovery switch 55 is operated and the automatic brake is released.

The automatic brake activation notifying lamp 63 is not limited to a lamp and may also emit a sound. Moreover, the automatic brake activation notifying lamp 63 may be displayed on a display panel such as a monitor.

The means for reporting information to the operator by means of the abovementioned reporting system 24 may be selected from a lamp, a sound, or a monitor as appropriate.

(Detecting System 25)

As illustrated in FIG. 2, the detecting system 25 includes the rearward detecting section 71, a traveling state detecting section 72, and a work implement state detecting section 73.

The rearward detecting section 71 detects an obstacle to the rear of the vehicle body 1. While the rearward detecting section 71 is attached, for example, to the rear end of the vehicle body 1 as illustrated in FIG. 1, the attachment is not limited to the rear end.

The rearward detecting section 71 has, for example, a millimeter wave radar. The state of a radio wave in a millimeter-wave band being emitted from a transmission antenna, reflecting off the surface of the obstacle, and returning is detected by a reception antenna, and the distance to the object can be measured. The detection result by the rearward detecting section 71 is transmitted to the controller 26 and the controller 26 can detect the presence of an obstacle within a predetermined range during reverse travel. The rearward detecting section 71 is not limited to a millimeter-wave radar and may also be, for example, a camera.

The traveling state detecting section 72 detects the traveling state of the vehicle body 1. The traveling state detecting section 72 includes a travel direction sensor 72a and a vehicle speed sensor 72b.

The travel direction sensor 72a detects the rotating direction of the front tires 4 or the rear tires 7 and detects whether the vehicle body 1 is in a forward travel or reverse traveling state. While the travel direction sensor 72a is disposed, for example on an axle 34, the travel direction sensor 72a can be disposed in any configuration in the driving system 21 so long as the traveling state of the vehicle body 1 can be detected. Moreover, forward travel or reverse travel may also be judged on the basis of the position of the FNR lever 52 in place of the travel direction sensor 72a or together with the travel direction sensor 72a. In this case, the FNR lever 52 is also included in the traveling state detecting section 72.

The work implement state detecting section 73 detects the state of the work implement 3. The work implement state detecting section 73 includes a boom angle sensor 73a (example of a work implement height detecting section) and a boom bottom pressure sensor 73b.

The boom angle sensor 73a detects the angle of the boom 14 and outputs a detection value to the controller 26 (example of a control section). The boom angle sensor 73a may be constituted by a potentiometer and is disposed, for example, on the boom pin 14a.

As illustrated in FIG. 1, the angle of the boom 14 is a boom angle θ of a straight line Lb that extends from the center of the boom pin 14a in the direction toward the center of the bucket pin 15a, with respect to a horizontal line Lh that extends forward from the center of the boom pin 14. The boom angle θ is set to zero degrees when the straight line Lb is horizontal. The boom angle θ of the boom 14 is set as positive when the straight line Lb is higher than the horizontal line Lh. The boom angle θ of the boom 14 is set as negative when the straight line Lb is lower than the horizontal line Lh.

The boom angle sensor 73a may also be a stroke sensor provided to the lift cylinder 16.

The boom bottom pressure sensor 73b is attached to the bottom side of the lift cylinder 16. Pressure is applied to the bottom side of the lift cylinder 16 and the cylinder extends with the pressure and raises the boom 14. The boom bottom pressure sensor 73b detects the pressure (bottom pressure) of the hydraulic fluid inside the oil chamber on the cylinder bottom side of the lift cylinder 16. The boom bottom pressure sensor 73b transmits the detected bottom pressure to the controller 26.

(Controller 26)

The controller 26 includes a processor and a storage device. The processor is, for example, a central processing unit (CPU). Alternatively, the processor may be a processor different from a CPU. The processor executes processing for controlling the wheel loader 10 in accordance with a program. The storage device includes a non-volatile memory such as a read-only memory (ROM) and a volatile memory such as a random access memory (RAM). The storage device may include an auxiliary storage device such as a hard disk or a solid state drive (SSD). The storage device is an example of a non-transitory computer-readable recording medium. The storage device stores data and a program for controlling the wheel loader 10. The storage device stores, for example, the data of belowmentioned thresholds.

Figure 3:
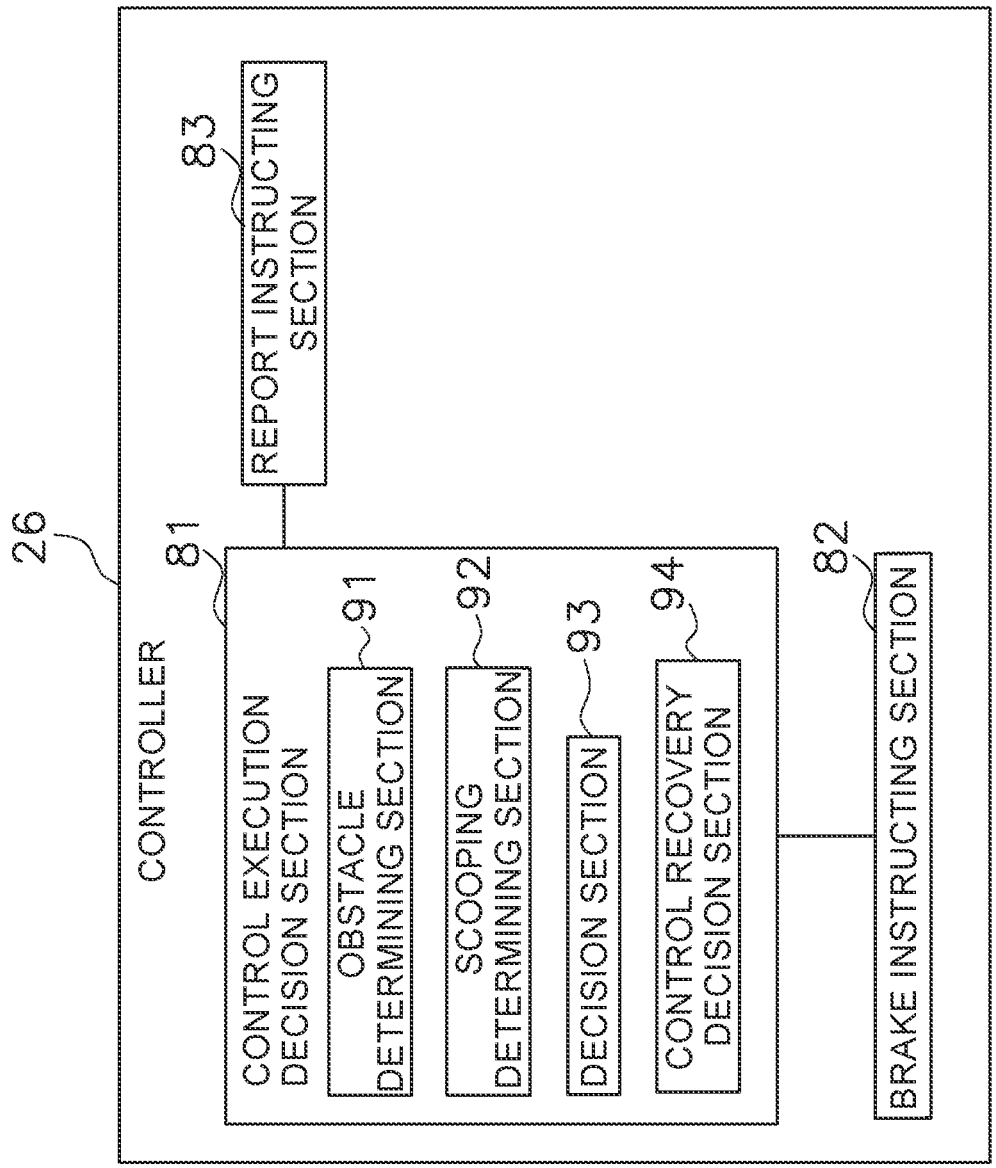
FIG. 3 is a block diagram illustrating a configuration of the controller in FIG. 2.

FIG. 3 is a block diagram illustrating a configuration of the controller 26.

The controller 26 includes a control execution decision section 81, a brake instructing section 82, and a report instructing section 83. The controller 26 is not limited to one section and a plurality of controllers may be provided, and the functions of the control execution decision section 81, the brake instructing section 82, and the report instructing section 83 may be provided while being divided among the plurality of controllers.

The control execution decision section 81 decides the execution of the controls of the reporting system 24 and the braking system 22. The control execution decision section 81 includes an obstacle determining section 91, a scooping determining section 92, a decision section 93, and a control recovery decision section 94.

The obstacle determining section 91 determines whether an obstacle is present during reverse travel. The obstacle determining section 91 detects that reverse travel is occurring due to either the front tires 4 or the rear tires 7 rotating in the reverse direction according to the detection by the travel direction sensor 72a, or due to the FNR lever 52 being in the reverse travel position. The obstacle determining section 91 detects that an obstacle is present upon receiving, from the rearward detecting section 71 of the detecting system 25, detection information of an obstacle in a predetermined range while reverse travel is detected.

The scooping determining section 92 determines whether the work content of the wheel loader 10 during forward travel is scooping work.

Specifically, the scooping determining section 92 determines whether the wheel loader 10 is in an excavating work state during forward travel and then determines whether the wheel loader 10 is in the scooping work state while the determination of the excavating work state is maintained.

Figure 4:
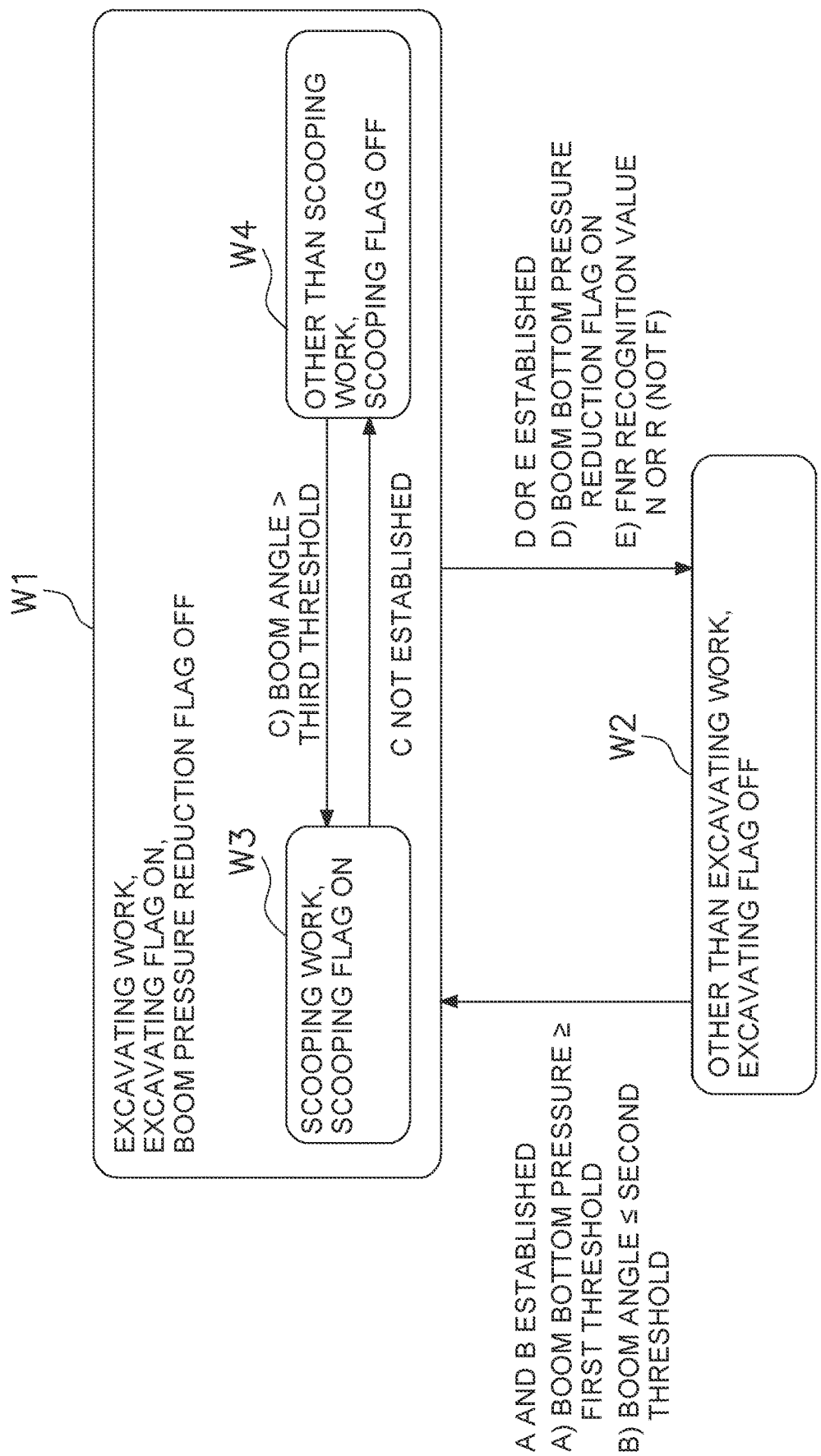
FIG. 4 illustrates transitions between work states of the wheel loader in FIG. 1.

FIG. 4 illustrates state transitions of work content. The scooping determining section 92 determines an excavating work state W1 or a state W2 other than excavating work.

The scooping determining section 92 determines the excavating work state W1 when a condition A or a condition B is established during forward travel.

The scooping determining section 92 determines that the vehicle body 1 is traveling forward (forward traveling state) due to the front tires 4 or the rear tires 7 rotating in the forward direction or due to the FNR lever 52 being in the forward travel position.

The condition (A) is that the boom bottom pressure that is a detection value by the boom bottom pressure sensor 73b is equal to or greater than a first threshold. The first threshold is stored in the controller 26. It is understood that pressure is being applied to the lift cylinder 16 due to the boom bottom pressure being equal to or greater than a predetermined threshold. That is, whether the wheel loader 10 is in the excavating work state can be determined by detecting the boom bottom pressure because while excavating, etc., pressure is being applied to the lift cylinder 16 due to earth and sand being loaded into the bucket 15.

The condition (B) is that the angle θ of the boom 14 that is the detection value by the boom angle sensor 73a is equal to or greater than a second threshold. The second threshold is preferably a negative value because the angle θ of the boom 14 is positioned below horizontal while excavating. The second threshold is stored in the controller 26.

That is, when a pressure equal to or greater than the predetermined first threshold is applied to the lift cylinder 16 and the angle θ of the boom 14 is equal to or less than the predetermined second threshold, it is determined that a state of the wheel loader 10 is the excavating work state W1. The scooping determining section 92 sets an excavation flag to ON and sets a boom pressure reduction flag to OFF when it is determined that the state of the wheel loader 10 is the excavating work state W1.

Next, the scooping determining section 92 determines whether the state of the wheel loader 10 is a scooping work state W3 or a state W4 other than scooping work within the excavating work state W1. The scooping determining section 92 determines that the sidle of the wheel loader 10 is the scooping work state W3 when a condition (C) is satisfied while the excavation flag is ON, and determines that the state of the wheel loader 10 is the state W4 other than scooping work when the condition (C) is not satisfied.

The condition (C) is that the angle θ of the boom 14 that is the detection value by the boom angle sensor 73a is greater than a third threshold. The third threshold is, for example, a negative value. The third threshold is set to be larger than the second threshold. The third threshold is stored in the controller 26. The second threshold indicates a state where the position of the bucket 15 is near the tire ground contact surface. The second threshold can be set, for example, to −90°. Additionally, the third threshold indicates a state where the boom 14 is positioned approximately in the middle between a horizontal slate and the state of the second threshold. The third threshold can be set, for example, to −20°. The third threshold and the second threshold are set so that the boom 14 at the third threshold is rotated further upward than the boom 14 at the second threshold.

While the condition (B) and the condition (C) are set on the basis of the size of the angle of the boom 14, the present invention is not limited in this way. The position of the bucket 15 may be detected and the conditions may also be set on the basis of the height thereof. The position of the bucket 15 can be detected, for example, with a camera provided to the cab 5 or the like. Moreover, the third threshold and the second threshold are set so that the height of the bucket 15 at the third threshold is greater than the height of the bucket 15 at the second threshold.

In this way, the condition (B) and the condition (C) may be set on the basis of the height of the work implement 3, and the height of the work implement 3 at the third threshold may be set to be greater than the height of the work implement 3 at the second threshold.

The scooping determining section 92 determines that the state of the wheel loader 10 is the scooping work state W3 and raises a scooping flag. In addition, the scooping determining section 92 sets the scooping flag to OFF when it is determined that the condition (C) is not satisfied while the excavation flag is in the ON state.

The scooping work state W3 and the state W4 other than scooping work can be discriminated by detecting the angle θ of the boom 14 during the excavating work state W1 because the boom 14 is normally positioned higher during scooping than during excavating.

The scooping determining section 92 sets the excavation flag to OFF which indicates that the state of the wheel loader 10 is the state W2 other than excavating work when a condition (D) or a condition (E) are satisfied while the excavation flag is ON.

The condition (D) is that a boom bottom pressure reduction flag is ON. The boom bottom pressure reduction flag is set to ON when the detection value by the boom bottom pressure sensor 73b is smaller over a predetermined time period than the boom bottom pressure that serves as a previously set threshold on the basis of the angle θ of the boom 14. The boom bottom pressure that serves as a previously set threshold on the basis of the angle θ of the boom 14 is stored in the controller 26.

In this way, the scooping determining section 92 sets the boom bottom pressure reduction flag to ON, determines that the state of the wheel loader 10 has transitioned to the state W2 other than excavating work, and sets the excavation flag to OFF when the boom bottom pressure is smaller over a predetermined time period than a threshold set on the basis of the boom angle.

The condition (E) is that the position of the FNR lever 52 is disposed in a position other than forward travel (F) (reverse travel (R) or neutral (N)). The scooping determining section 92 determines that the slate of the wheel loader 10 is the ale W2 other than excavating work and sets the excavation flag to OFF when not in forward travel.

As described above, when the condition (A) and the condition (B) are satisfied and the state of the wheel loader 10 is determined as the excavating work state W1, the scooping determining section 92 determines that the wheel loader 10 is in the scooping work state W3 and sets the scooping flag to ON while the above determination is maintained and furthermore when the condition (C) is satisfied.

The decision section 93 determines the control of the reporting system 24 and the braking system 22 on the basis of the determination result of the scooping determining section 92.

The decision section 93 validates a first control as the control of the reporting system 24 and the braking system 22 when it is determined by the scooping determining section 92 that the state of the wheel loader 10 is not the scooping work (in FIG. 4, the state W2 other than excavating work and the state W4 other than scooping work).

Figure 5:
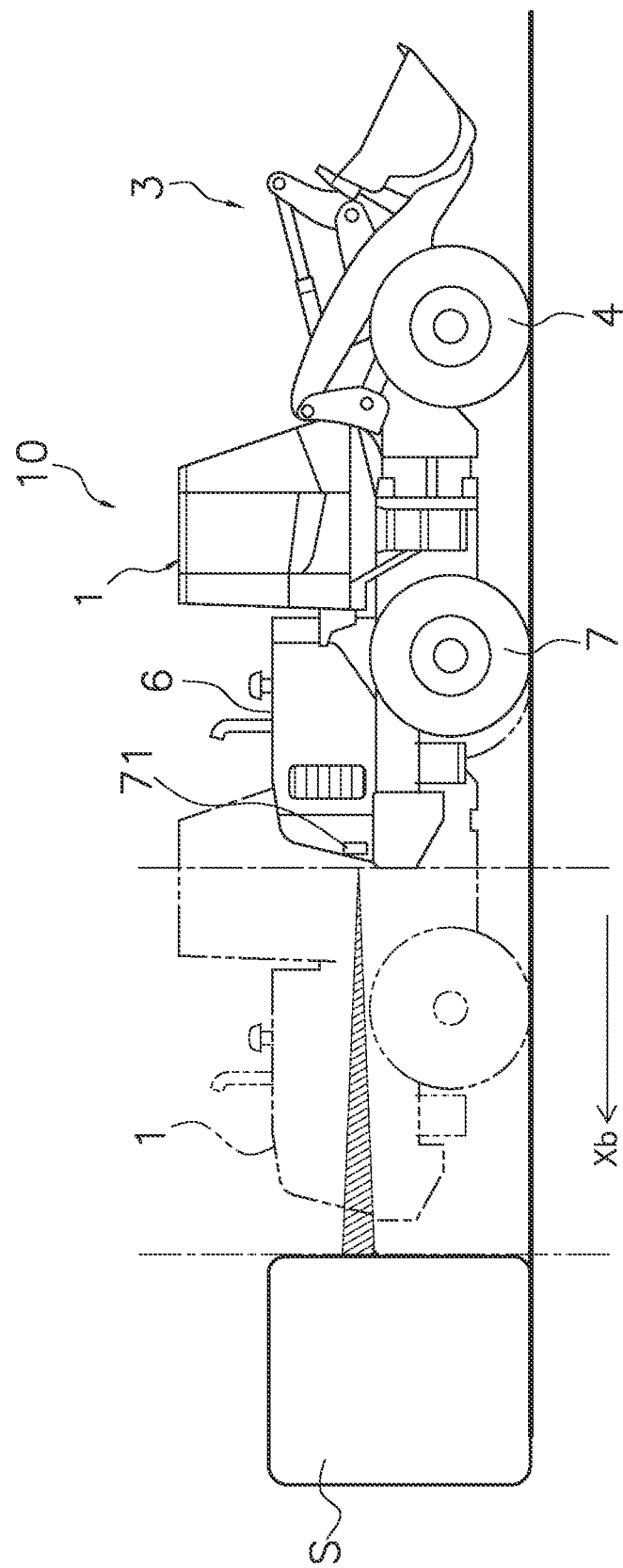
FIG. 5 is a side view for explaining an automatic brake function by means of an obstacle detection in the wheel loader of FIG. 1.

The first control involves activating the automatic brake and issuing a warning for indicating that an obstacle is present (example of corresponding to the detection of an object) as illustrated in FIG. 5 below when the obstacle determining section 91 has determined that an obstacle is present during reverse travel. This is because the wheel loader 10 is not performing scooping work and the detection of an obstacle can be judged as not being a false detection.

In addition, the decision section 93 validates a second control as the control of the reporting system 24 and the braking system 22 when it is determined by the scooping determining section 92 that the state of the wheel loader 10 is the scooping work state W3. The second control involves not activating the automatic brake and not issuing a warning regardless of whether the obstacle determining section 91 determines that an obstacle is present during reverse travel. The first control is invalidated when the second control is validated.

Figure 6:
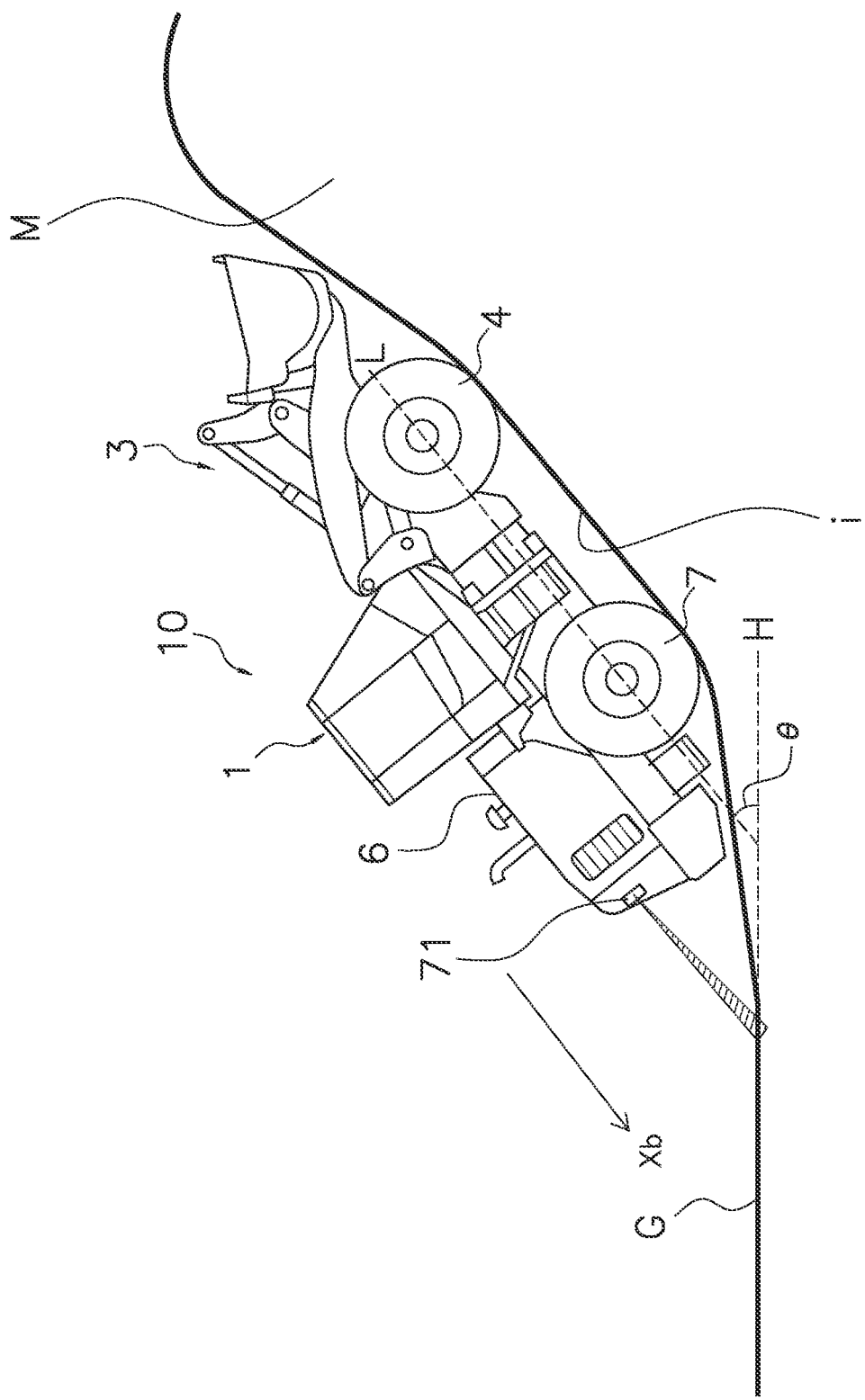
FIG. 6 is a side view for explaining scooping work by the wheel loader in FIG. 1.

This is because it can be determined that the wheel loader 10 is performing scooping work and it can be judged that the ground surface is falsely detected as an obstacle as illustrated in FIG. 6 below.

The brake instructing section 82 controls the automatic brake on the basis of the validated control among the first control and the second control validated by the decision section 93. The automatic brake in the present description automatically activates a braking force on the vehicle body 1 on the basis of the determination result by the obstacle determining section 91 and the determination result by the scooping determining section 92, and is not limited to only a braking force by the service brakes 42 as discussed below.

When the first control is validated by the decision section 93, the brake instructing section 82 stops the fuel supply to the engine 31 by turning off the accelerator 51 when the obstacle determining section 91 has determined that an obstacle is present during reverse travel. The brake instructing section 82 then drives the service brakes 42 by operating the brake valve 41 and stops the vehicle body 1. When the second control is validated by the decision section 93, the function of the automatic brake is stopped and the brake instructing section 82 does not operate the brake valve 41 and a braking force is not applied. That is, in the second control, a braking force is not applied even when the obstacle determining section 91 has determined that an obstacle is present during reverse travel.

The report instructing section 83 instructs the actions of the warning device 61 or the function OFF notifying lamp 62 on the basis of the validated control among the first control and the second control by the decision section 93.

While the first control is validated by the decision section 93, the report instructing section 83 activates the warning device 61 and reports the presence of the obstacle and the action of the automatic brake to the operator when the obstacle determining section 91 has determined that an obstacle is present during reverse travel.

Conversely, when the second control is validated by the decision section 93, the report instructing section 83 stops the function of the warning device 61, turns on the function OFF notifying lamp 62, and reports that the function of the automatic brake is stopped to the operator. That is, in the second control, a warning is not issued even when the obstacle determining section 91 has determined that an obstacle is present during reverse travel.

FIG. 5 is a diagram for illustrating a state in which an obstacle S is detected during reverse travel and the vehicle body 1 is stopped. In the first control, the service brakes 42 are activated with a set brake force (also called the braking force) previously set so that the vehicle body 1 stops before the obstacle S, and causes the vehicle body 1 to stop. In FIG. 5, the stopped vehicle body 1 is indicated by the chain double-dashed line.

The automatic brake produced by the set brake force may not brake the vehicle body 1 by means of the service brakes 42 as described above and the parking brake 43 may be activated. In this case, the decision section 93 validates the first control as the control of the reporting system 24 and the braking system 22, and the brake instructing section 82 stops the fuel supply to the engine 31 by turning off the accelerator 51 when an obstacle S is detected during reverse travel. The brake instructing section 82 then controls the parking brake 43 and brakes the vehicle body 1.

FIG. 6 illustrates a state in which the wheel loader 10 is performing scooping work. As illustrated in FIG. 6, a pile M of earth and sand is formed on the ground surface G and the wheel loader 10 is disposed on the slope i thereof. An inclination angle θ is, for example, an angle formed by a line L that connects the axis of the front tires 4 and the axis of the rear tires 7, and a horizontal line H.

After the scooping work, the wheel loader 10 descends from the slope i and therefore detects the ground surface G as an obstacle S when traveling in reverse. As a result, the second control is validated as the control of the reporting system 24 and the braking system 22 when the state of the wheel loader 10 is determined as the scooping work state W3 in the present embodiment. In the second control, the function of the automatic brake and the function of the warning device 61 are stopped, the function OFF notifying lamp 62 is lit, and the automatic brake and the warning device 61 are not activated.

Under the second control, the state of the rearward detecting section 71 itself may be set to the OFF state, and even though the detection by the rearward detecting section 71 is performed, the controller 26 may not use the detection result. Alternatively, the detection result by the rearward detecting section 71 is used and a determination is made by the obstacle determining section 91, but the determination result is not used.

The control recovery decision section 94 determines, on the basis of information related to the scooping work state, to recover from invalidating to validating the first control. The information related to the scooping work state includes the vehicle speed, the position of the FNR lever 52 (example of an operating member), the travel distance, the braking state of the parking brake, and the position of the key.

The control recovery decision section 94 acquires the vehicle speed from the detection value transmitted by the vehicle speed sensor 72b. The control recovery decision section 94 acquires the position of the FNR lever 52 (example of an operating member) with the operating information transmitted by the FNR lever 52. The control recovery decision section 94 acquires the travel distance by computation using the vehicle speed signal transmitted by the vehicle speed sensor 72b to the controller 26 and a timer included in the controller 26. The control recovery decision section 94 acquires the braking state of the parking brake 43 from an ON/OFF signal transmitted by the parking switch 53. The control recovery decision section 94 acquires the position of the key from the position information transmitted by the engine key section 57.

The control recovery decision section 94 decides to recover the validating of the first control when any one of the following conditions (1) to (6) is satisfied on the basis of the acquired information.

(1) The vehicle speed is equal to or greater than a predetermined speed and the FNR lever 52 is disposed in the reverse travel position.
(2) A predetermined time period or greater has elapsed since the FNR lever 52 was disposed in the reverse travel position.
(3) The wheel loader 10 has traveled a predetermined distance or greater since the FNR lever 52 was disposed in the reverse travel position.
(4) The FNR lever 52 has been moved from the reverse travel position to the neutral position or has been moved from the reverse travel position to the forward travel position.
(5) The parking brake has been activated.
(6) The key is in the OFF state.

Because it can be assumed the state where the wheel loader 10 has descended from the pile of earth and sand after the scooping work when any one of the conditions (1) to (3) have been satisfied, the control recovery decision section 94 decides to recover the validating of the first control instead of the second control as the control of the reporting system 24 and the braking system 22. Additionally, because it can be assumed that the wheel loader 10 has stopped for some reason when any of the conditions (4) to (6) are satisfied, the control recovery decision section 94 decides to recover the validating of the first control instead of the second control as the control of the reporting system 24 and the braking system 22.

When the recovery of the validating of the first control has been decided by the control recovery decision section 94, the decision section 93 validates the first control instead of the second control as the control of the reporting system 24 and the braking system 22.

In this way, after the scooping work state has been determined and the first control invalidated, the recovery of the validating of the first control is decided on the basis of a condition other than the determination of the scooping work state, whereby the false detection of the ground as an obstacle when descending from the pile after scooping work can be prevented.

(Actions)

Next, the control actions of the wheel loader 10 of the present embodiment will be explained below.

Figure 7:
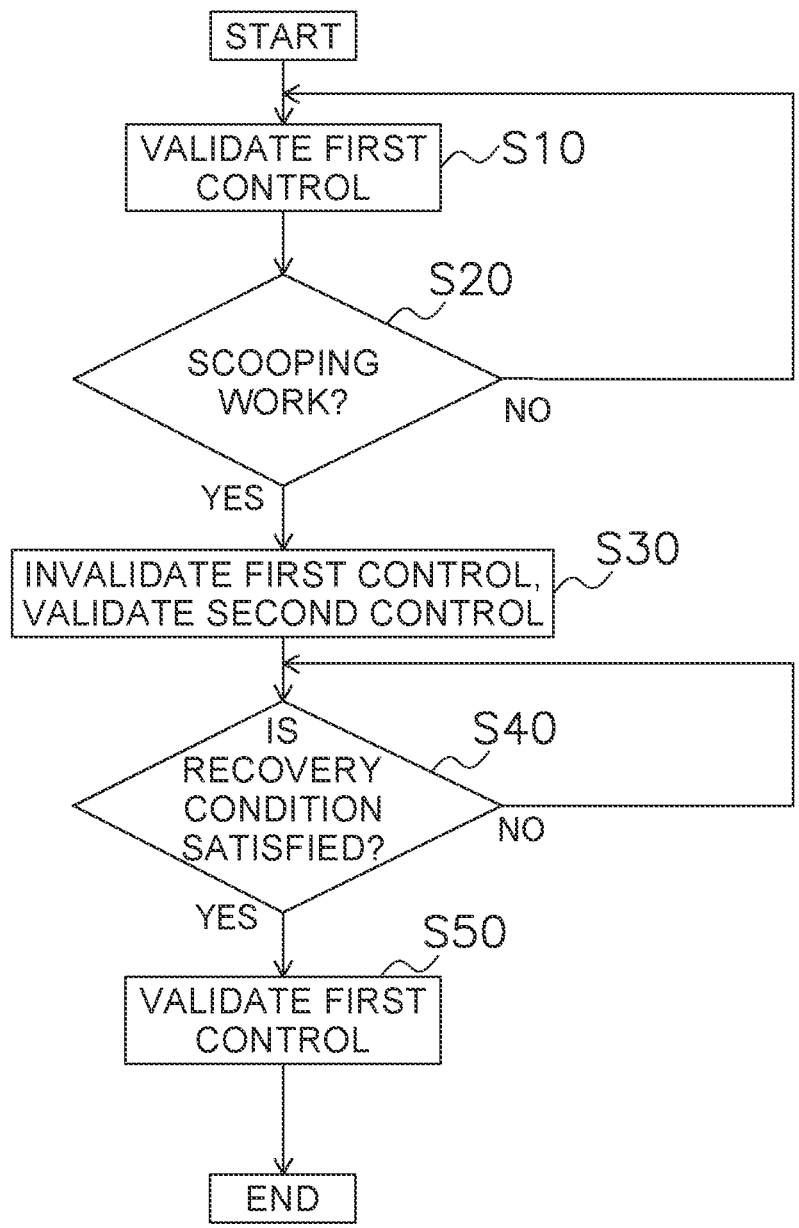
FIG. 7 is a flow chart for explaining control operation of the wheel loader in FIG. 1.

FIG. 7 is a flow chart illustrating the control actions of the wheel loader 10 of the present embodiment.

First in step S10 (example of a control decision step), the decision section 93 of the controller 26 validates the first control as the control of the reporting system 24 and the braking system 22. In the first control, the automatic brake is activated and the warning is issued when the obstacle determining section 91 has determined that an obstacle is present during reverse travel.

Next in step S20 (example of a scooping determination step), the scooping determining section 92 of the controller 26 determines whether the state of the vehicle body 1 is the scooping work state W3. When it is determined in step S20 that the state of the wheel loader 10 is not the scooping work state, the control returns to step S10 and the validating of the first control is maintained.

However, when it is determined that the slate of the wheel loader 10 is the scooping work state W3 in step S20, the control advances to step S30.

In step S30 (example of a stopping step), the decision section 93 invalidates the first control and validates the second control as the control of the reporting system 24 and the braking system 22. While the second control is validated, the function of the automatic brake and the function of the warning device 61 are stopped and the function OFF notifying lamp 62 is lit. As a result, the automatic brake and the warning device 61 are not activated even when it is determined that an obstacle is present during reverse travel.

Next in step S90, the control recovery decision section 94 determines whether any of the aforementioned conditions (1) to (6) are satisfied on the basis of the information related to the scooping work state, and determines whether to recover the validating of the first control as the control of the reporting system 24 and the braking system 22.

When none of the conditions (1) to (6) are satisfied and it is determined that the validating of the first control is not recovered in step S40, step S90 is repeated until any one of the conditions (1) to (6) is satisfied. When the control recovery decision section 94 has determined that any one of the conditions (1) to (6) have been satisfied in step S90, the control advances to step S50.

In step S50, the decision section 93 recovers the validating of the first control as the control of the reporting system 24 and the braking system 22.

As a result, even when the wheel loader 10 is descending a slope after scooping work, the function of the automatic brake and the function of the warning device 61 are stopped, and the false detection of the ground surface G as an obstacle can be reduced.

In addition, because the function of the automatic brake is stopped, the wheel loader 10 being unable to descend from the pile M of earth and sand by detecting the ground surface after scooping work can be prevented.

Embodiment 2

Next, the wheel loader 10 of a second embodiment according to the present disclosure will be explained.

While the wheel loader 10 in the first embodiment determines whether the state of the wheel loader 10 is the scooping work state on the basis of the detection by the work implement state detecting section 73, whether the state of the wheel loader 10 is the scooping work state is determined on the basis of the inclination state of the vehicle body 1 in the wheel loader 10 of the second embodiment. In addition, the decision for recovering the validating of the first control in the wheel loader 10 of the second embodiment is made on the basis of the inclination state of the vehicle body 1 which differs from the conditions used for deciding to recover the validating of the first control in the wheel loader 10 of the first embodiment.

Figure 8:
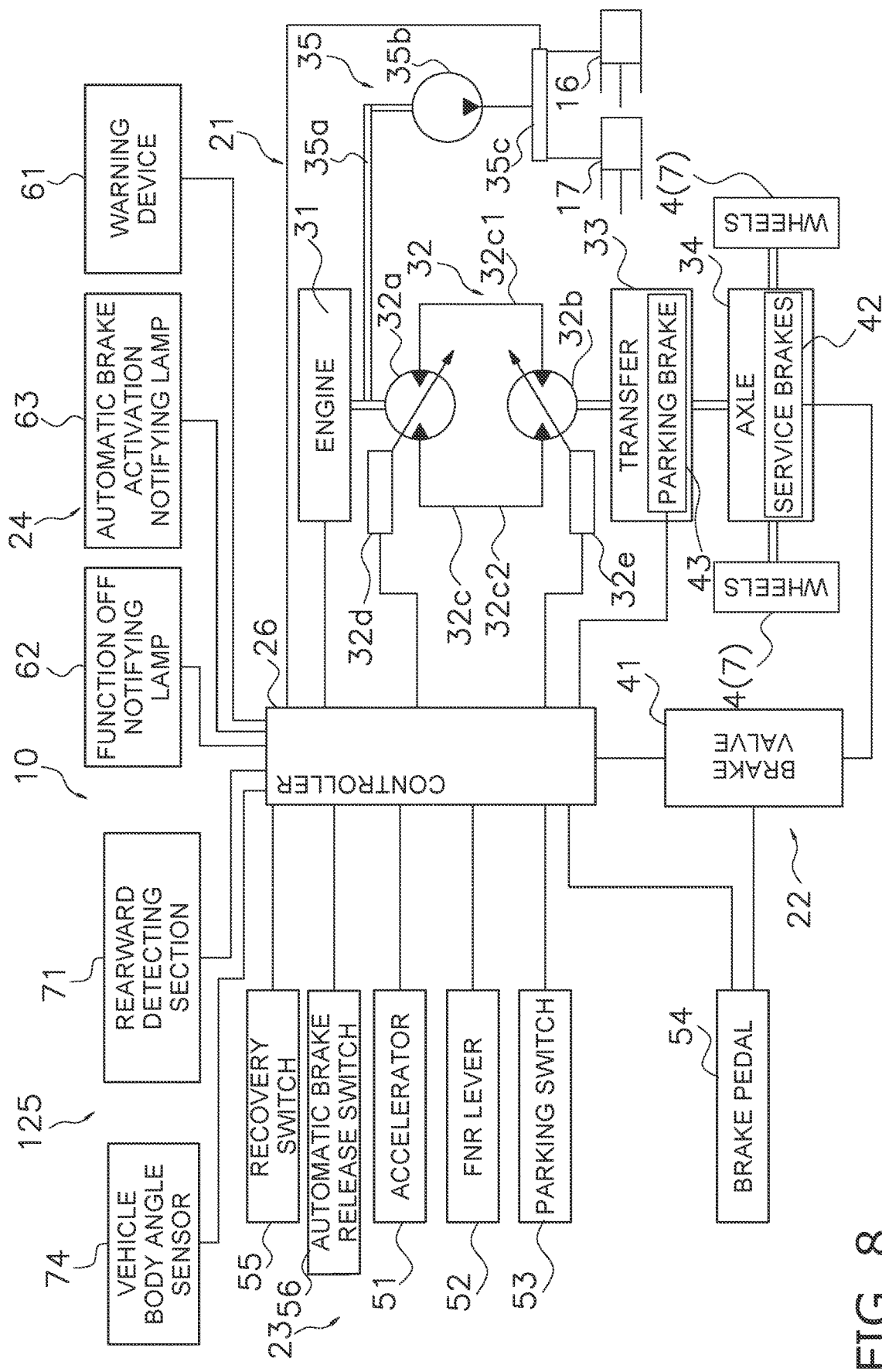
FIG. 8 is a block diagram illustrating configurations of a driving system, a braking system, an operating system, a reporting system, and a detecting system of the wheel loader of a second embodiment according to the present disclosure.

FIG. 8 is a block diagram illustrating configurations of the driving system 21, the braking system 22, the operating system 23, the reporting system 24, and a detecting system 125 of the wheel loader 10 of the second embodiment. The detecting system 125 of the wheel loader 10 of the second embodiment is not provided with the traveling state detecting section 72 and the work implement state detecting section 73 in comparison to the detecting system 25 of the first embodiment, and is provided with a vehicle body angle sensor 74 (example of an inclination state detecting section).

The vehicle body angle sensor 74 detects the inclination state of the vehicle body 1. The vehicle body angle sensor 74 detects whether the vehicle body 1 is in an inclination state by detecting the angle of the vehicle body 1. An inertial measurement unit (IMU) may be used instead of the vehicle body angle sensor 74 and the inclination state of the wheel loader 10 may be decided on the basis of a detection image from a camera installed inside or outside the vehicle body. In addition, the above configurations are not limited thereto so long as a configuration that is able to detect the inclination state of the wheel loader 10 is used.

In the second embodiment, the scooping determining section 92 determines whether the state of the wheel loader 10 is the scooping work state on the basis of a detection value of the vehicle body angle sensor 74. The scooping determining section 92 determines that the state of the wheel loader 10 is the scooping work state when the inclination angle from the vehicle body angle sensor 74 is equal to or greater than a predetermined threshold $\theta 1$ (example of a fourth threshold, e.g., 20°). The inclination angle $\theta$ (see FIG. 6) is the angle that the front side of the wheel loader 10 rises upward with respect to horizontal.

In the second embodiment, the control recovery decision section 94 decides to recover the validating of the first control when the inclination angle from the vehicle body angle sensor 74 is equal to or less than a predetermined threshold $\theta 2$ (example of a fifth threshold, e.g., 10°). This is because it is assumed that the vehicle body 1 is in a state of descending from an inclined surface as when performing scooping work. The predetermined threshold $\theta 2$ is set to be smaller than the predetermined threshold $\theta 1$.

Figure 9:
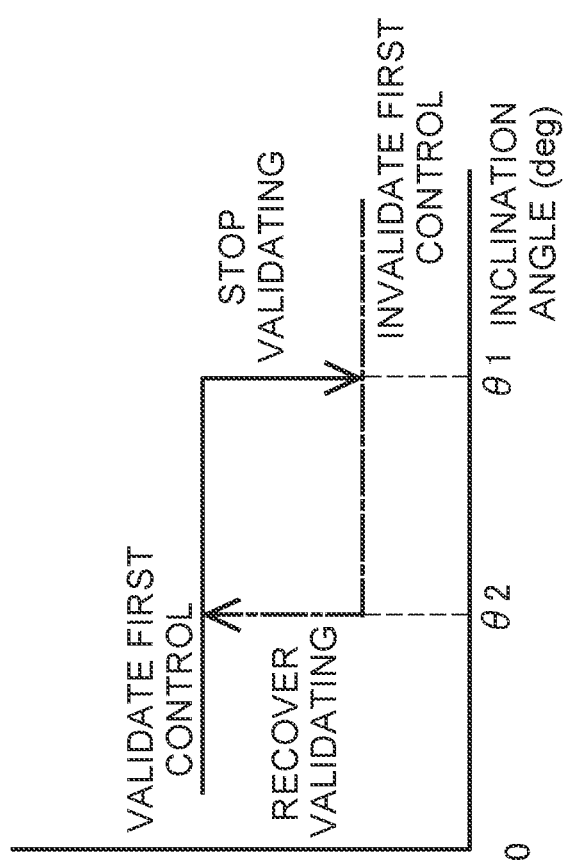
FIG. 9 illustrates the relationship between invalidating the first control and recovering from invalidating to validating the first control with respect to an inclination angle of the wheel loader in FIG. 8.

FIG. 9 illustrates the relationship between recovering the invalidating and recovering the validating of the first control with respect to the inclination angle. As illustrated in FIG. 9, the threshold $\theta 2$ for determining that the scooping work is finished and that the vehicle body 1 has descended from the pile and deciding to recover the validating of the first control, is set to be smaller than the threshold $\theta 1$ for determining that the state of the wheel loader 10 is the scooping work state and invalidating the first control.

Figure 10:
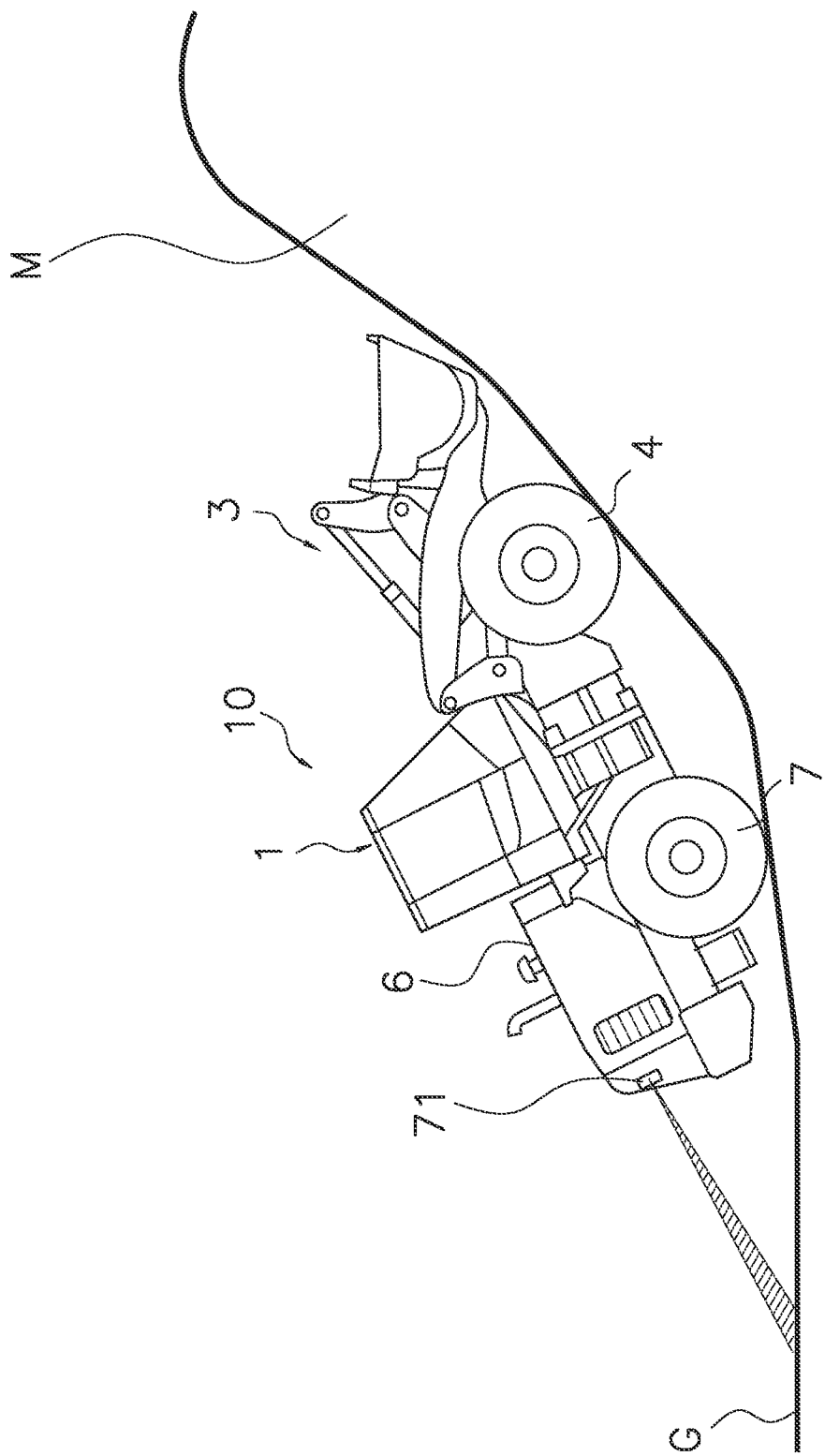
FIG. 10 is a side view illustrating a state midway through the wheel loader in FIG. 1 descending from a pile.

For example, when the threshold $\theta 1$ and the threshold $\theta 2$ are the same value, the ground surface G is falsely detected as an obstacle because the setting of the first control is recovered midway through descending from the pile after the scooping work as illustrated in FIG. 10.

As a result, the threshold $\theta 2$ is set to be smaller than the threshold $\theta 1$ whereby false detections can be reduced.

When explaining the control actions of the wheel loader 10 of the second embodiment using FIG. 7, the scooping determining section 92 in step S20 determines that the state of the wheel loader 10 is the scooping work state when the inclination angle from the vehicle body angle sensor 74 is equal to or greater than the predetermined threshold $\theta 1$, and the control advances to step S30. Conversely, when the inclination angle is less than the predetermined threshold θ1, it is determined that the state of the wheel loader 10 is not the scooping work state and the control returns to step S10.

Additionally, the control recovery decision section 94 in step S40 decides to recover the validating of the first control when the recovery condition has been satisfied when the inclination angle from the vehicle body angle sensor 74 is equal to or less than the predetermined threshold θ2, and the control advances to step S50. Conversely, when the inclination angle from the vehicle body angle sensor 74 is greater than the predetermined threshold θ2, the recovery condition is not satisfied, the control in step S40 is repeated, and step S90 continues repeating until the recovery condition is satisfied.

(Characteristics)

(1)

The wheel loader 10 (example of a work machine) of the present embodiment comprises the vehicle body 1, the rearward detecting section 71, and the controller 26 (example of a control section). The vehicle body 1 includes the vehicle body frame 2, the front tires 4, and the rear tires 7 (example of a traveling unit), and the work implement 3 disposed in front of the vehicle body frame 2. The rearward detecting section 71 detects an obstacle (example of an object) when traveling in reverse due to the driving of the vehicle body frame 2, the front tires 4, and the rear tires 7. The controller 26 determines to validate or invalidate a first control according to the detection of an obstacle, the state of rearward travel, and the state of scooping work by the work implement 3, and validates the first control on the basis of the scooping work state when the first control is invalidated.

As a result, the first control that is performed according to the need to mitigate a collision when an obstacle is detected, is invalidated according to the determination of the scooping work state, and the validating of the first control is recovered from invalidating when there is no longer any need to invalidate the first control.

As a result, because the first control is not validated even when descending from a pile of earth and sand after scooping work, the detection of the ground surface G as an obstacle is prevented and warnings caused by false detections can be reduced.

(2)

The wheel loader 10 (example of a work machine) of the present embodiment further comprises the warning device 61 (example of a first reporting section). The warning device 61 reports that an obstacle is detected to the rear of the vehicle body 1 by the rearward detecting section 71. The controller 26 validates the second control when the first control is invalidated. The first control involves issuing a report with the warning device 61. The second control involves changing the reporting by the warning device 61. The change of the reporting includes stopping the reporting, suppressing the volume of the reporting, or changing the output state of the reporting.

As a result, when the first control is invalidated, the issue of a warning can be stopped, the intensity of the warning can be suppressed, or the warning can be changed from sound to a lamp.

(3)

In the wheel loader 10 (example of a work machine) of the present embodiment, the information related to the scooping work state includes the vehicle speed, the position of the FNR lever 52 (example of an operating member), and the travel distance. The controller 26 validates the first control when the vehicle speed is equal to or greater than a predetermined speed and the FNR lever 52 is disposed in the reverse travel position, when a predetermined time period or greater has elapsed since the FNR lever 52 has been disposed in the reverse travel position, and/or when the wheel loader 10 has traveled a predetermined distance or greater since the FNR lever 52 was disposed in the reverse travel position, while the first control is invalidated.

Consequently, because the state is understood as having descended from the pile of earth and sand after the scooping work, the validating of the first control suited to the detection of an obstacle can be recovered.

(4)

In the wheel loader 10 (example of a work machine) of the present embodiment, the information related to the scooping work state includes the position of the FNR lever 52 (example of an operating member), the braking state of the parking brake 43, or the ON/OFF state of the engine key section 57 (example of a key). The controller 26 validates the first control when the FNR lever 52 has been moved from the reverse travel position to the neutral position or has been moved from the reverse travel position to the forward travel position, when the parking brake 43 has been activated, or when the engine key section 57 is in the OFF state, while the first control is invalidated.

Consequently, because it reason is understood that the work vehicle has stopped due to some, the validating of the first control suited to the detection of an obstacle can be recovered.

(5)

The wheel loader 10 (example of a work machine) of the present embodiment comprises the traveling state detecting section 72 and the work implement state detecting section 73. The traveling state detecting section 72 detects the traveling state of the vehicle body 1. The work implement state detecting section 73 detects the state of the work implement 3. The information related to the scooping work state includes the traveling state and the state of the work implement 3. The controller 26 determines whether the wheel loader 10 is in the scooping work state on the basis of the state of the work implement 3 during forward travel.

Consequently, whether the state of the wheel loader 10 is the scooping work state can be determined from the traveling state of the vehicle body 1 and the state of the work implement 3.

(6)

In the wheel loader 10 (example of a work machine) of the present embodiment, the work implement 3 includes the boom 14, the bucket 15, and the lift cylinder 16 (example of a boom cylinder). The boom 14 is attached to the front part of the vehicle body frame 2 in an operable manner. The bucket 15 is connected to the boom 14 so that the opening is disposed toward the front, and is driven with respect to the boom 14. The lift cylinder 16 drives the boom 14. The work implement state detecting section 73 comprises the boom bottom pressure sensor 73b and the boom angle sensor 73a. The boom bottom pressure sensor 73b detects the bottom pressure of the lift cylinder 16. The boom angle sensor 73a detects the angle of the boom 14. The controller 26 determines whether the state of the wheel loader 10 is the scooping work state on the basis of the bottom pressure of the lift cylinder 16 and the angle of the boom 14.

In this way, the angle θ of the boom 14 and the bottom pressure of the lift cylinder 16 are detected, whereby it can be determined whether the wheel loader 10 is in the scooping work state.

(7)

In the wheel loader 10 (example of a work machine) of the present embodiment, the controller 26 determines that the state of the wheel loader 10 is the excavating work state when the bottom pressure of the lift cylinder 16 is equal to or greater than the first threshold and when the angle of the boom 14 is equal to or less than the second threshold, and determines that the state of the wheel loader 10 is the scooping work state when the angle of the boom 14 while the excavating work state is determined is greater than the third threshold. The third threshold is positioned higher than the second threshold.

In this way, whether the wheel loader 10 is in the excavating work state is determined by detecting the angle of the boom 14 and the bottom pressure of the lift cylinder 16, and after the excavating work state has been determined, it can be determined that the excavating work is the scooping work on the basis of the angle of the boom 14. This is because the scooping work slate and a state other than scooping work can be discriminated during the excavating work state because the boom 14 is normally positioned higher during scooping than during excavating.

(8)

In the wheel loader 10 (example of a work machine) of the present embodiment, the traveling slate detecting section 72 detects the rotating direction of the front tires 4 or the rear tires 7 provided to the vehicle body 1 or detects the set position of the FNR lever 52 that can be set for forward or reverse travel of the vehicle body 1. The controller 26 determines that the wheel loader 10 is traveling forward on the basis of the detection by the traveling state detecting section 72.

As a result, whether the state of the wheel loader 10 is the scooping work state can be detected while the vehicle body 1 is traveling forward.

(9)

The wheel loader 10 (example of a work machine) of the present embodiment further comprises the vehicle body angle sensor 74 (example of an inclination state detecting section). The vehicle body angle sensor 74 detects the inclination state of the vehicle body 1. The information related to the scooping work state includes the inclination state. The controller 26 determines that the state of the wheel loader 10 is the scooping work state when the inclination angle of the vehicle body 1 is equal to or greater than the fourth threshold.

Because the vehicle body 1 is disposed in a sloped location such as a pile of earth and sand during the scooping work, whether the state of the wheel loader 10 is the scooping work state can be determined by detecting the inclination.

(10)

In the wheel loader 10 (example of a work machine) of the present embodiment, the information related to the scooping work state includes the inclination state. The controller 26 validates the first control when the inclination angle of the vehicle body 1 is equal to or less than a fifth threshold that is smaller than the fourth threshold while the first control is invalidated.

In this way, by changing the sizes of the fourth threshold of the inclination angle that is used for determining whether the state of the wheel loader 10 is the scooping work and the fifth threshold of the inclination angle for causing the control to be recovered to the first control for performing actions for reducing collisions, and setting the fifth threshold to be lower than the fourth threshold, false detections in the midway through descending from the pile can be reduced.

(11)

The wheel loader 10 (example of a work machine) of the present embodiment further comprises the traveling state detecting section 72 that detects the traveling state of the vehicle body 1. The controller 26 executes the detection of objects to the rear of the vehicle body 1 during reverse travel. The traveling state detecting section 72 detects the rotating direction of the front tires 4 or the rear tires 7 provided to the vehicle body 1 or detects the set position of the FNR lever 52 that can be set for forward or reverse travel of the vehicle body 1. The controller 26 determines that the vehicle body 1 is traveling in reverse on the basis of the detection by the traveling state detecting section 72.

Consequently, the fact that the vehicle body 1 is traveling in reverse can be detected.

(12)

In the wheel loader 10 (example of a work machine) of the present embodiment, the controller 26 validates the second control when the first control is invalidated. The first control involves driving the automatic brake for automatically braking the vehicle body 1. The second control involves suppressing the braking force of the automatic brake or stopping the automatic brake.

As a result, the activation of the automatic brake and the stopping of the vehicle body 1 can be prevented when the vehicle body 1 is disposed in a sloped location during, for example, the scooping work.

(13)

The wheel loader 10 (example of a work machine) of the present embodiment further comprises the function OFF notifying lamp 62 (example of a second reporting section) that issues the report that the braking force of the automatic brake is suppressed or the automatic brake is stopped. The controller 26 issues the report to the operator with the function OFF notifying lamp 62 when the braking force of the automatic brake is suppressed or the automatic brake is stopped.

As a result, the operator is able to recognize that the automatic brake is suppressed or stopped.

(14)

In the wheel loader 10 (example of a work machine) of the present embodiment, the work implement 3 has the boom 14, the bucket 15, the bucket cylinder 17 (example of an actuator), and the bell crank 18 (example of a sub link). The boom 14 is attached to the front part of the vehicle body frame 2 in a swingable manner. The bucket 15 is connected to the boom 14 so that the opening is disposed toward the front, and is driven with respect to the boom 14. The bucket cylinder 17 drives the bucket 15. The bell crank 18 is attached to the boom 14 and transmits the driving power of the bucket cylinder 17 to the bucket 15.

As a result, in the wheel loader 10 having a front loading configuration, warnings due to false detections activated by the warning device 61 due to falsely detecting the ground surface G as an obstacle S during scooping work and after scooping work can be suppressed.

(15)

The control method of the wheel loader 10 (example of a work machine) of the present embodiment comprises the step S10 and S30 (example of control decision step), and the steps S40 and S50 (example of control validating step). The steps S10 and S30 involve deciding to validate or invalidate the first control according to the detection of an object when traveling in reverse due to the driving of the traveling unit of the vehicle body 1 having the vehicle body frame 2, the front tires 4, and the rear tires 7 (example of an traveling unit) and the work implement 3, the rearward traveling state, and the scooping work state by the work implement 3. The steps S40 and S50 involve validating the first control on the basis of the scooping work state when the first control is invalidated.

As a result, the first control that is performed according to the need to mitigate a collision when an obstacle is detected, is invalidated according to the determination of the scooping work state, and the validating of the first control is recovered from invalidating when there is no longer any need to invalidate the first control.

As a result, because the first control is not validated even when descending from a pile of earth and sand after scooping work, the detection of the ground surface G as an obstacle is prevented and warnings caused by false detections can be reduced.

OTHER EMBODIMENTS

Although an embodiment of the present invention has been described so far, the present invention is not limited to the above embodiment and various modifications may be made within the scope of the invention.

(A)

While the function of the automatic brake is stopped in the second control in the above embodiments, the present invention is not limited to stopping and the automatic brake may be controlled by setting the opening degree of the brake valve 41 smaller than during the first control so that the automatic brake acts with a weak brake force. This weak brake force corresponds to an example of suppressing the automatic brake. The suppression of the automatic brake at this time may be notified with the function OFF notifying lamp 62.

The weak brake force may be caused by performing a control when the operator turns the accelerator 51 off instead of adjusting the opening degree of the brake valve 41. The fuel supply to the engine 31 is stopped by the operator turning the accelerator 51 off, the skew plates of the pump 32a and the motor 32b are controlled so as to provide travel resistance, and the weak brake force is activated. That is, a control may be performed so that the brake instructing section 82 stops the fuel supply to the engine 31 and the skew plates of the pump 32a and the motor 32b provide travel resistance.

The weak brake force may also be activated by performing the control when the FNR lever 52 is operated so as to be in the neutral position instead of only performing the control when the accelerator is turned OFF. When the FNR lever 52 is in the neutral position, the controller 26 controls the solenoids 32d and 32e and moves the skew plates of the pump 32a and the motor 32b so as to provide travel resistance. That is, a control may be performed so that the brake instructing section 82 stops the fuel supply to the engine 31 and the skew plates of the pump 32a and the motor 32b provide travel resistance.

Consequently, the braking force works and a weal brake force is produced. A greater brake force can be attained in neutral than when only turning the accelerator 51 OFF.

(B)

Figure 11:
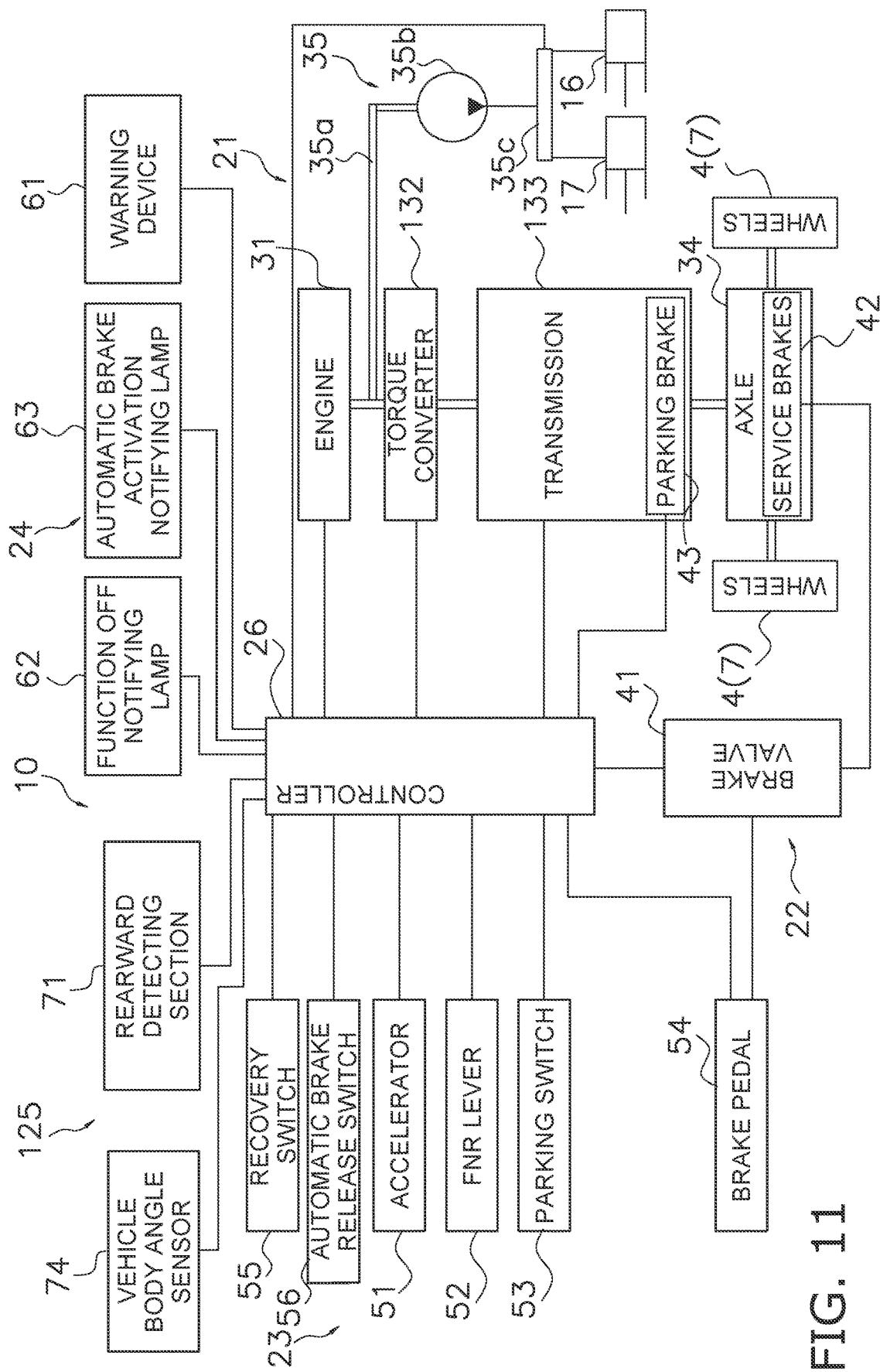
FIG. 11 is a block diagram illustrating configurations of a driving system, a braking system, an operating system, and a reporting system of the wheel loader of a modified example of the embodiments according to the present disclosure.

While the HST 32 is used in the driving system 21 in the above embodiments, the present invention is not limited to the HST and a torque converter may be used. FIG. 11 is a block diagram illustrating a configuration in which a torque converter 132 and a transmission 133 are provided in the driving system 21. While FIG. 11 describes a modified example of configuration of the second embodiment, the configuration in which the torque converter 132 and the transmission 133 are provided to the driving system 21 may also be applied to the first embodiment.

The driving power from the engine 31 is transmitted to the transmission 133 through the torque converter body 132. The transmission 133 changes the rotational driving power of the engine 31 transmitted through the torque converter 132 and transmits the rotational driving power to the axles 34. The parking brake 43 is provided to the transmission 133.

With the torque converter, the opening degree of the brake valve 41 may be set to be smaller in the same way as described above in order to produce a weak brake force as explained above in (A). Moreover, the brake force is weaker in comparison to the HST and only the control of turning the accelerator 51 OFF may be performed. When a set brake force is produced, the opening degree of the brake valve 41 may be increased or the parking brake 43 may be used in the same way as the above embodiments.

Furthermore, the present invention is not limited to the HST and a hydro mechanical transmission (HMT) may also be used.

(C)

While the automatic brake is not activated and the warning device 61 is not activated in the second control in the above embodiments, for example, only the warning device 61 may be activated. In addition, only the automatic brake may be activated or both the automatic brake and the warning device 61 may be activated. When both are activated, a control may be performed such that the braking force of the automatic brake is suppressed or the intensity of the warning by the warning device 61 is suppressed in the second control so as to be different from the first control.

(D)

While the wheel loader 10 of the above embodiments has the function of the automatic brake, the function of the automatic brake may be omitted. In this case, the automatic brake is not activated and the warning device 61 is activated in the first control. The activation of the warning device 61 is not performed in the second control.

Additionally, the volume of the warning may be changed in response to the distance from the vehicle body 1 to the obstacle in the first control.

(E)

While the warning by the warning device 61 is stopped in the second control as an example of changing the reporting of the warning device 61 in the above embodiments, the present invention is not limited thereto and the volume of the warning may be suppressed or the output form of the warning may be changed. The change of the output form of the warning is, for example, changing from reporting with sound to reporting with light.

(F)

The control of the braking force can be appropriately applied to the service brakes 42, the parking brake 43, or another means for changing the braking force.

(G)

The determination conditions of the scooping work state in the first embodiment and the recovery condition in the second embodiment may be combined, or conversely, the determination conditions of the scooping work slate in the second embodiment and the recovery conditions in the first embodiment may be combined.

In addition, the determination conditions of the scooping work state in the first embodiment and the second embodiment may be combined, or the recovery conditions of the first embodiment and the second embodiment may be combined. For example, the condition that the inclination angle is equal to or greater than the threshold θ2 may be added as a seventh condition to the conditions (1) to (6) as a recovery condition, and the recovery condition may be satisfied when any one of the conditions (1) to (7) are satisfied.

(H)

While the function OFF notifying lamp 62 is normally lit in the second control in the above embodiments, the function OFF notifying lamp 62 may only be lit when an obstacle is detected during reverse travel.

(I)

The wheel loader of the above embodiments may be operated while an operator is sitting in the wheel loader, the wheel loader may also be operated in an unmanned manner.

(J)

While the wheel loader is used in the discussion as an example of the work machine in the above embodiments, the present invention is not limited thereto and the work machine may be a bulldozer, a forklift, or the like.

According to the work machine and the method for controlling the work machine of the present disclosure, the present disclosure demonstrates the effect that a warning can be issued while considering withdrawal from scooping work and is useful as a wheel loader or the like.

What is claimed is:

1. A work machine comprising:
   a vehicle body including a traveling unit and a work implement disposed in front of the traveling unit, the traveling unit including a wheel;
   a rearward detecting section, including a first sensor, configured to detect an object when traveling in reverse due to driving of the traveling unit;
   a control section, including an electronic controller, configured to decide to
      validate or invalidate a first control according to a detection of the object, a state of traveling in reverse, and a scooping work state by the work implement, and
      validate the first control based on the scooping work state when the first control is invalidated; and
   a first reporting section, including a first indicator, configured to report when an object is detected to a rear of the vehicle body by the rearward detecting section, and
   the control section being further configured to change the report by the first reporting section when the first control is invalidated.

2. The work machine according to claim 1, wherein
   the first control involves reporting with the first reporting section, and
   the change of the reporting includes stopping the reporting, suppressing a volume of the reporting, or changing an output state of the reporting.

3. A work machine comprising:
   a vehicle body including a traveling unit and a work implement disposed in front of the traveling unit, the traveling unit including a wheel;
   a rearward detecting section, including a sensor, configured to detect an object when traveling in reverse due to driving of the traveling unit; and
   a control section, including an electronic controller, configured to decide to
      validate or invalidate a first control according to a detection of the object, a state of traveling in reverse, and a scooping work state by the work implement, and
      validate the first control based on the scooping work state when the first control is invalidated,
   an information related to the scooping work state includes a vehicle speed, a position of an operating member, or a travel distance, and
   the control section is further configured to validate the first control when the vehicle speed is equal to or greater than a predetermined speed and the operating member is disposed in a reverse travel position, when a predetermined time period or greater has elapsed since the operating member was disposed in the reverse travel position, or when the work machine has traveled a predetermined distance or greater since the operating member was disposed in the reverse travel position, while the first control is invalidated.

4. The work machine according to claim 1, wherein
   an information related to the scooping work state includes a position of an operating member, a braking state of a parking brake, or an ON/OFF state of a key, and
   the control section is further configured to validate the first control when the operating member has been moved from a reverse travel position to a neutral position or has been moved from a reverse travel position to a forward travel position, when a parking brake has been activated, or when the key is in the OFF state, while the first control is invalidated.

5. The work machine according to claim 1, further comprising:
   a traveling state detecting section, including a second sensor, configured to detect a traveling state of the vehicle body, and
   a work implement state detecting section configured to detect a state of the work implement,
   an information related to the scooping work state including the traveling state and the state of the work implement, and
   the control section being further configured to determine whether a state of the work machine is the scooping work state based on the state of the work implement during forward travel.

6. The work machine according to claim 5, wherein
   the work implement includes
      a boom attached in an operable manner to a front part of the traveling unit,
      a bucket connected to the boom so that an opening is disposed toward a front, the bucked configured to be driven with respect to the boom, and
      a boom cylinder configured to drive the boom, and
   the work implement state detecting section further includes
      a boom bottom pressure sensor configured to detect a bottom pressure of the boom cylinder, and
      a boom angle sensor configured to detect an angle of the boom, and
   the control section is further configured to determine whether the state of the work machine is the scooping work state based on the bottom pressure of the boom cylinder and the angle of the boom.

7. The work machine according to claim 6, wherein
   the control section is configured to
      determine that the state of the work machine is an excavating work state when the bottom pressure of the boom cylinder is equal to or greater than a first threshold and when the angle of the boom is equal to or less than a second threshold, and
      determine that the state of the work machine is the scooping work state when the angle of the boom while the excavating work state is determined, is greater than a third threshold, and
   the third threshold is higher than the second threshold.

8. The work machine according to claim 5, wherein
the traveling state detecting section is further configured to detect a rotating direction of wheels provided to the vehicle body or a position where an operating member configured to be set to forward travel or reverse travel of the vehicle body is set, and
the control section is further configured to determine that the traveling state is forward travel based on the detection by the traveling state detecting section.

9. The work machine according to claim 1, further comprising:
an inclination state detecting section configured to detect an inclination state of the vehicle body,
an information related to the scooping work state including the inclination state, and
the control section being further configured to determine that the state of the work machine is the scooping work state when an inclination angle of the vehicle body is equal to or greater than a fourth threshold.

10. The work machine according to claim 9, wherein
the information related to the scooping work state includes the inclination state, and
the control section is further configured to validate the first control when the inclination angle of the vehicle body is equal to or less than a fifth threshold that is smaller than the fourth threshold while the first control is invalidated.

11. The work machine according to claim 1, further comprising:
a traveling state detecting section configured to detect the traveling state of the vehicle body,
the control section being further configured to execute a detection of an object to a rear of the vehicle body during reverse travel,
the traveling state detecting section being further configured to detect a rotating direction of wheels provided to the vehicle body and a position where an operating member configured to be set to forward travel or reverse travel of the vehicle body is set, and
the control section being further configured to determine that the traveling state is reverse travel based on a detection by the traveling state detecting section.

12. The work machine according to claim 1, wherein
the control section is further configured to validate a second control when the first control is invalidated,
the first control involves driving an automatic brake for automatically braking the vehicle body, and
the second control involves suppressing a braking force of the automatic brake or stopping the automatic brake.

13. The work machine according to claim 12, further comprising:
a second reporting section, including a second indicator, configured to report that the braking force of the automatic brake is suppressed or the automatic brake is stopped,
the control section being further configured to issue a report to an operator with the second reporting section when the braking force of the automatic brake is suppressed or the automatic brake is stopped.

14. The work machine according to claim 1, wherein
the work machine is a wheel loader, and
the work implement includes
a boom attached in a swingable manner to a front part of the traveling unit,
a bucket connected to the boom so that an opening is disposed toward a front, and is driven with respect to the boom,
an actuator configured to drive the bucket, and
a sub link attached to the boom, the sub link transmitting driving power of the actuator to the boom.

15. A control method for work machine, the control method comprising:
deciding to validate or invalidate a first control according to
a detection of an object when traveling in reverse due to a driving of a traveling unit of a vehicle body having the traveling unit and a work implement,
a state of traveling in reverse, and
a scooping work state by the work implement;
validating the first control based on the scooping work state when the first control is invalidated;
reporting when an object has been detected behind the vehicle body while the vehicle is traveling in reverse; and
changing the reporting in the reporting step when the first control is invalidated.

* * * * *